United States Patent
Kim et al.

(10) Patent No.: US 11,271,695 B2
(45) Date of Patent: Mar. 8, 2022

(54) METHOD FOR MAPPING BETWEEN CODEWORD AND LAYER IN NEXT GENERATION COMMUNICATION SYSTEM AND APPARATUS THEREFOR

(71) Applicant: LG Electronics Inc., Seoul (KR)

(72) Inventors: Hyungtae Kim, Seoul (KR); Jiwon Kang, Seoul (KR); Jonghyun Park, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/619,856

(22) PCT Filed: Jun. 12, 2018

(86) PCT No.: PCT/KR2018/006630
§ 371 (c)(1),
(2) Date: Dec. 5, 2019

(87) PCT Pub. No.: WO2018/230923
PCT Pub. Date: Dec. 20, 2018

(65) Prior Publication Data
US 2020/0274667 A1    Aug. 27, 2020

Related U.S. Application Data

(60) Provisional application No. 62/557,081, filed on Sep. 11, 2017, provisional application No. 62/536,438, (Continued)

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0626* (2013.01); *H04L 5/0023* (2013.01);
(Continued)

(58) Field of Classification Search
CPC ......... H04B 7/04; H04B 7/0626; H04L 25/03; H04L 27/2613; H04L 5/00; H04L 5/0023;
(Continued)

(56) References Cited

U.S. PATENT DOCUMENTS

2010/0271988 A1*  10/2010  Jia ................... H04L 25/0328
                                                      370/280
2011/0026622 A1    2/2011  Luo et al.
(Continued)

OTHER PUBLICATIONS

Intel Corporation, Status Report to TSG, "Further enhancements to Coordinated Multi-Point (CoMP) Operation for LTE", 3GPP TSG RAN meeting #76, Jun. 5-8, 2017, RP-171030.
(Continued)

*Primary Examiner* — Stephen J Clawson
(74) *Attorney, Agent, or Firm* — Dentons US LLP

(57) ABSTRACT

Disclosed is a method for receiving a downlink signal by a terminal in a wireless communication system. Specifically, the method comprises the steps of: receiving, from a network, information on at least two first-type reference signal port groups and information on at least two second-type reference signal port groups; and receiving, from at least two transmission points constituting the network, a downlink signal including at least two codewords by using the information on the at least two first-type reference signal port groups and the information on the at least two second-type reference signal port groups, wherein the at least two first-type reference signal port groups correspond to different transmission points and the at least two second-type reference signal port groups correspond to different codewords.

4 Claims, 9 Drawing Sheets

Receiving information about first type DM-RS port groups and information about second type DM-RS port groups — S901

Receiving downlink signal including multiple CWs using information about first type DM-RS port groups and information about second type DM-RS port groups from multiple TPs — S903

Related U.S. Application Data filed on Jul. 24, 2017, provisional application No. 62/524,586, filed on Jun. 25, 2017, provisional application No. 62/519,794, filed on Jun. 14, 2017.

(51) Int. Cl.
  *H04L 27/26* (2006.01)
  *H04W 72/04* (2009.01)

(52) U.S. Cl.
  CPC ........ *H04L 5/0094* (2013.01); *H04L 27/2613* (2013.01); *H04W 72/042* (2013.01); *H04W 72/0446* (2013.01)

(58) Field of Classification Search
  CPC .. H04L 5/0048; H04L 5/0094; H04W 72/042; H04W 72/0446
  See application file for complete search history.

(56) References Cited

U.S. PATENT DOCUMENTS

| | | | | |
|---|---|---|---|---|
| 2012/0176884 | A1* | 7/2012 | Zhang | H04L 5/0035 370/203 |
| 2012/0300709 | A1 | 11/2012 | Su et al. | |
| 2013/0003788 | A1* | 1/2013 | Marinier | H04B 7/024 375/219 |
| 2013/0070732 | A1* | 3/2013 | Noh | H04L 5/0026 370/335 |
| 2013/0114656 | A1* | 5/2013 | Sayana | H04B 7/024 375/219 |
| 2013/0265955 | A1 | 10/2013 | Kim et al. | |
| 2014/0056156 | A1* | 2/2014 | Jongren | H04L 1/0077 370/252 |
| 2014/0254533 | A1* | 9/2014 | Kim | H04B 7/0413 370/329 |
| 2015/0173052 | A1* | 6/2015 | Zhang | H04L 5/0094 370/329 |
| 2015/0215908 | A1* | 7/2015 | Seo | H04L 27/2613 370/329 |
| 2017/0079017 | A1* | 3/2017 | Kim | H04W 72/042 |
| 2017/0272220 | A1* | 9/2017 | Chen | H04L 1/0027 |
| 2018/0042028 | A1* | 2/2018 | Nam | H04B 7/0626 |
| 2019/0260532 | A1* | 8/2019 | Manolakos | H04L 5/0023 |
| 2019/0297603 | A1* | 9/2019 | Guo | H04L 5/0051 |
| 2020/0036555 | A1* | 1/2020 | Davydov | H04L 25/0224 |
| 2020/0235901 | A1* | 7/2020 | Dou | H04B 7/024 |

OTHER PUBLICATIONS

Samsung, "Enhancements for non-coherent JT", 3GPP TSG RAN WG1#88, Feb. 13-17, 2017, R1-1702898.

ZTE, "Remaining details on QCL assumptions for DM-RS", 3GPP TSG RAN WG1 Meeting #89, May 15-19, 2017, R1-1707142.

* cited by examiner (A) CONTROL-PLANE PROTOCOL STACK (B) USER-PLANE PROTOCOL STACK (A)    (B)

METHOD FOR MAPPING BETWEEN CODEWORD AND LAYER IN NEXT GENERATION COMMUNICATION SYSTEM AND APPARATUS THEREFOR

This application is the National Stage filing under 35 U.S.C. 371 of International Application No. PCT/KR2018/006630 filed on Jun. 12, 2018, which claims the benefit of U.S. Provisional Applications No. 62/519,794 filed on Jun. 14, 2017; 62/524,586 filed on Jun. 25, 2017; 62/536,438 filed on Jul. 24, 2017 and 62/557,081 filed on Sep. 11, 2017, the contents of which are all hereby incorporated by reference herein in their entirety.

TECHNICAL FIELD

The present disclosure relates to a wireless communication system, and more particularly, to a codeword-to-layer mapping method in a next-generation communication system and apparatus therefor.

BACKGROUND ART

With the introduction of a new radio access technology (new RAT or NR) system, the necessity for mobile broadband communication much improved than the conventional RAT increases as a number of communication devices require higher communication capacity.

In addition, massive machine type communications (MTC) capable of providing various services anytime and anywhere by connecting multiple devices or things to each other is considered as one of the main issues discussed in the next generation communication system. Moreover, a communication system design capable of supporting services/user equipments (UEs) sensitive to reliability and latency is also under discussion. That is, the NR is expected to provide services by considering enhanced mobile broadband communication (eMBB), massive MTC (mMTC), ultra-reliable and low-latency communication (URLLC), etc. In the next-generation 5G system, scenarios may be divided into enhanced mobile broadband (eMBB), ultra-reliable machine-type communications (uMTC), massive machine-type communications (mMTC), etc. The eMBB corresponds to a next-generation mobile communication scenario characterized by high spectrum efficiency, high user-experienced data rate, high peak data rate, etc. The uMTC corresponds to a next-generation mobile communication scenario characterized by ultra-high reliability, ultra-low latency, ultra-high availability, etc. (for example, V2X, emergency services, remote control, etc.). The mMTC corresponds to a next-generation mobile communication scenario characterized by low cost, low energy, short packets, massive connectivity, etc.

DISCLOSURE

Technical Problem

Based on the above discussion, a method of transmitting and receiving a demodulation reference signal (DM-RS) in a next-generation communication system and apparatus therefor is described.

Technical Solution

In an aspect of the present disclosure, provided is a method of receiving a downlink signals by a UE in a wireless communication system. The method may include receiving, from a network, information on two or more first type reference signal port groups and information on two or more second type reference signal port groups and receiving the downlink signal from two or more transmission points constituting the network based on the information on the two or more first type reference signal port groups and the information on the two or more second type reference signal port groups. In this case, the downlink signal may include two or more codewords. The two or more first type reference signal port groups may correspond to different transmission points, and the two or more second type reference signal port groups may correspond to different codewords.

In another aspect of the present disclosure, provided is a UE in a wireless communication system. The UE may include a wireless communication module and a processor connected to the wireless communication module. The processor may be configured to receive, from a network, information on two or more first type reference signal port groups and information on two or more second type reference signal port groups and receive a downlink signal from two or more transmission points constituting the network based on the information on the two or more first type reference signal port groups and the information on the two or more second type reference signal port groups. In this case, the downlink signal may include two or more codewords. The two or more first type reference signal port groups may correspond to different transmission points, and the two or more second type reference signal port groups may correspond to different codewords.

The UE may receive the downlink signal on the assumption that antenna ports in each of the two or more first type reference signal port groups are quasi co-located (QCL) with the same channel status information-reference signal (CSI-RS). The UE may receive information on a mapping relationship between the two or more first type reference signal port groups and the two or more second type reference signal port groups.

The UE may receive two or more CSI-RSs from the network and report rank information for each of the two or more CSI-RSs to the network. The information on the two or more first type reference signal port groups and the information on the two or more second type reference signal port groups may be determined by the network based on the rank information.

Additionally, a reference signal may be a demodulation-reference signal (DM-RS).

Advantageous Effects

According the present disclosure, codeword-to-layer mapping may be efficiently performed when downlink transmission is performed in a next-generation communication system.

It will be appreciated by persons skilled in the art that the effects that could be achieved with the present disclosure are not limited to what has been particularly described hereinabove and other advantages of the present disclosure will be more clearly understood from the following detailed description.

BEST MODE

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

In the present disclosure, a base station (eNB) may be used as a broad meaning including a remote radio head (RRH), an eNB, a transmission point (TP), a reception point (RP), a relay, etc.

Firstly, a 3rd Generation Partnership Project (3GPP) Long Term Evolution (LTE) communication system will be schematically described.

Figure 1:
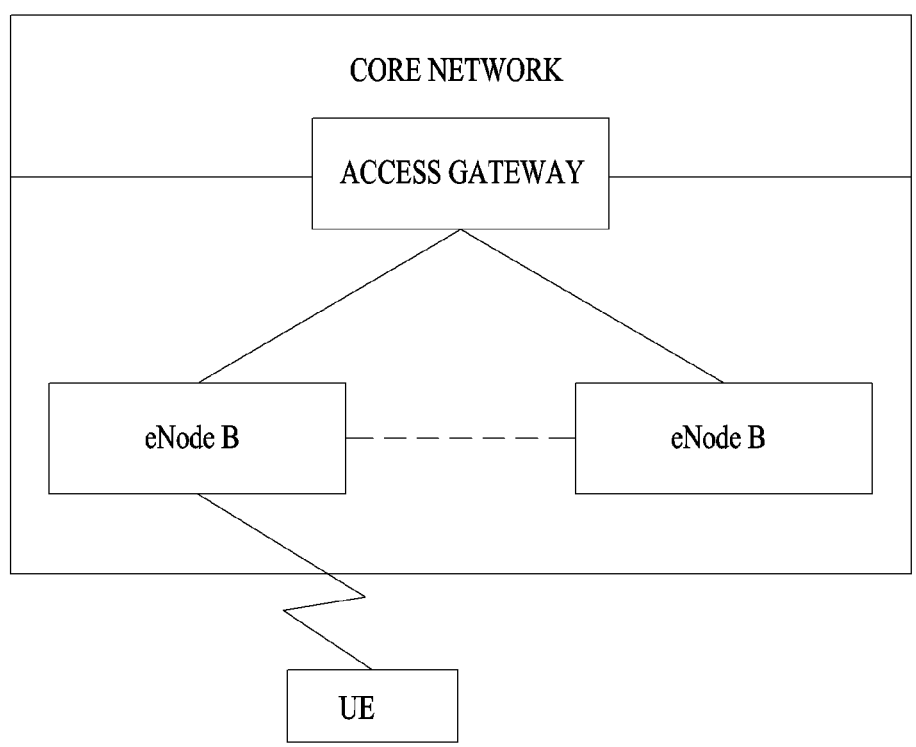
FIG. 1 is a diagram schematically illustrating a network structure of an evolved universal mobile telecommunications system (E-UMTS) as an exemplary radio communication system.

FIG. 1 is a diagram showing a network structure of an Evolved Universal Mobile Telecommunications System (E-UMTS) as a mobile communication system. The E-UMTS is an evolved form of the UMTS and has been standardized in the 3GPP. Generally, the E-UMTS may be called a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS mainly includes a User Equipment (UE), base stations (or eNBs or eNode Bs), and an Access Gateway (AG) which is located at an end of a network (E-UTRAN) and which is connected to an external network. Generally, an eNB may simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and Hybrid Automatic Repeat and reQuest (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic may be used between eNBs. A Core Network (CN) may include the AG and a network node or the like for user registration of the UE. The AG manages mobility of a UE on a Tracking Area (TA) basis.

Figure 2:
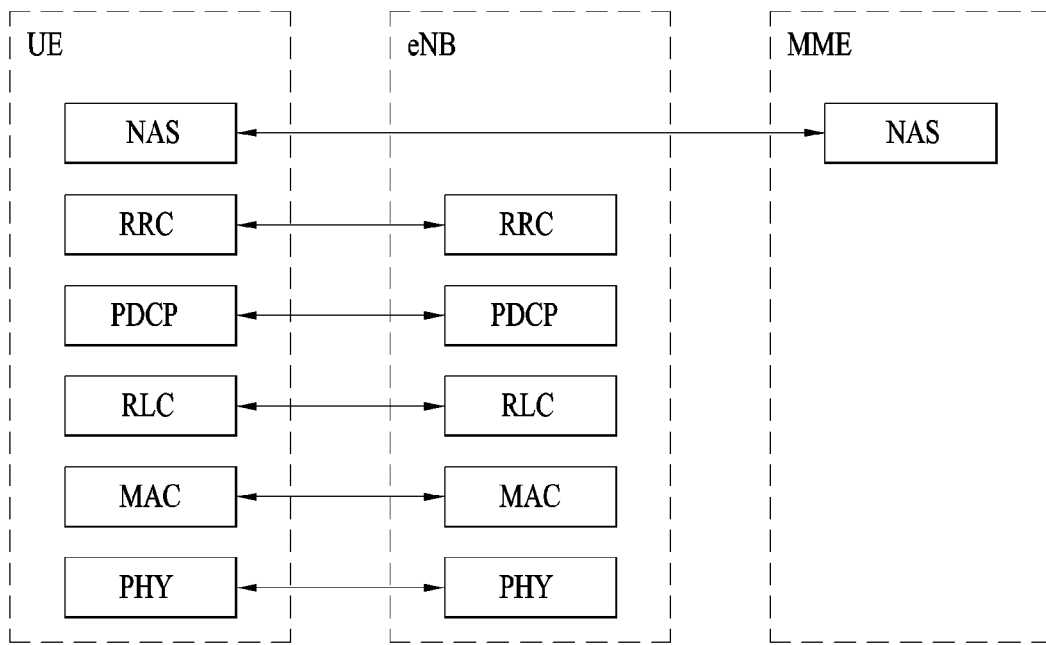
FIG. 2 is a diagram illustrating structures of a control plane and a user plane of a radio interface protocol between a UE and an evolved UMTS terrestrial radio access network (E-UTRAN) based on the 3GPP radio access network specification.
Figure 2:
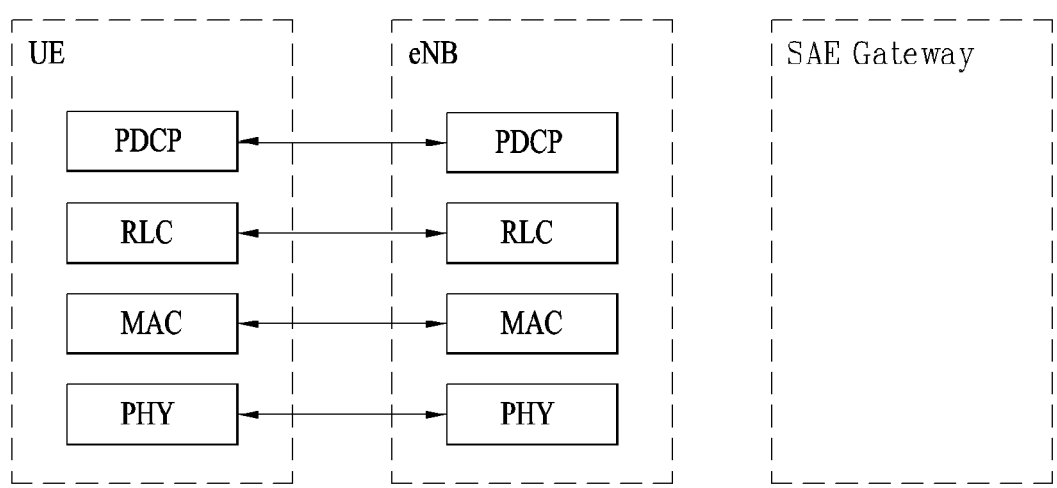

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel. Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
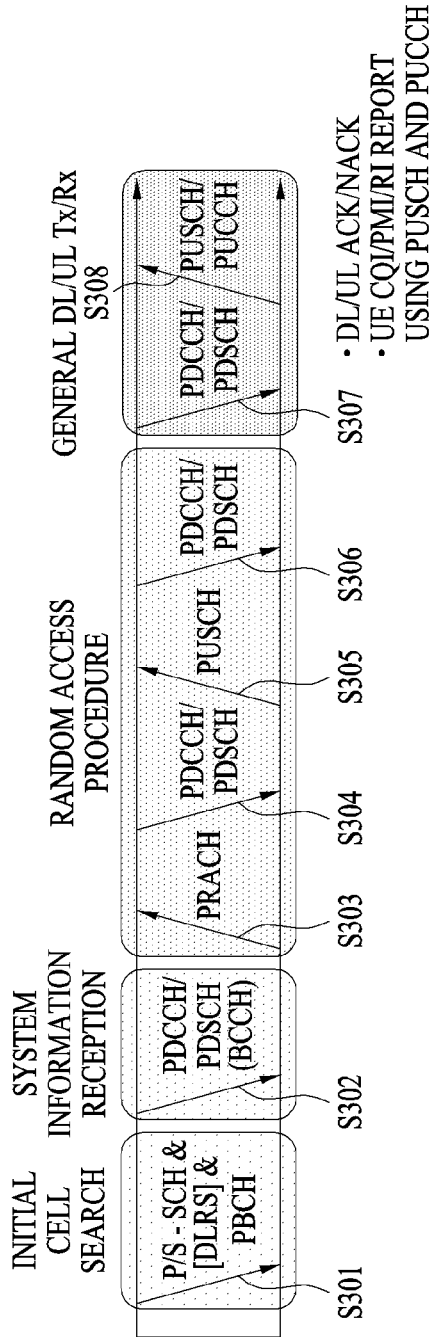
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
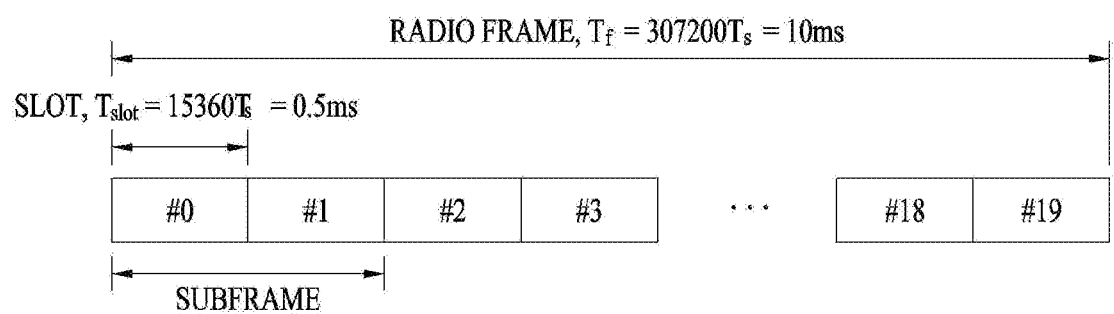
FIG. 4 is a diagram illustrating the structure of a radio frame used in a long term evolution (LTE) system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz× 2048)=3.2552×10$^{-8}$ (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
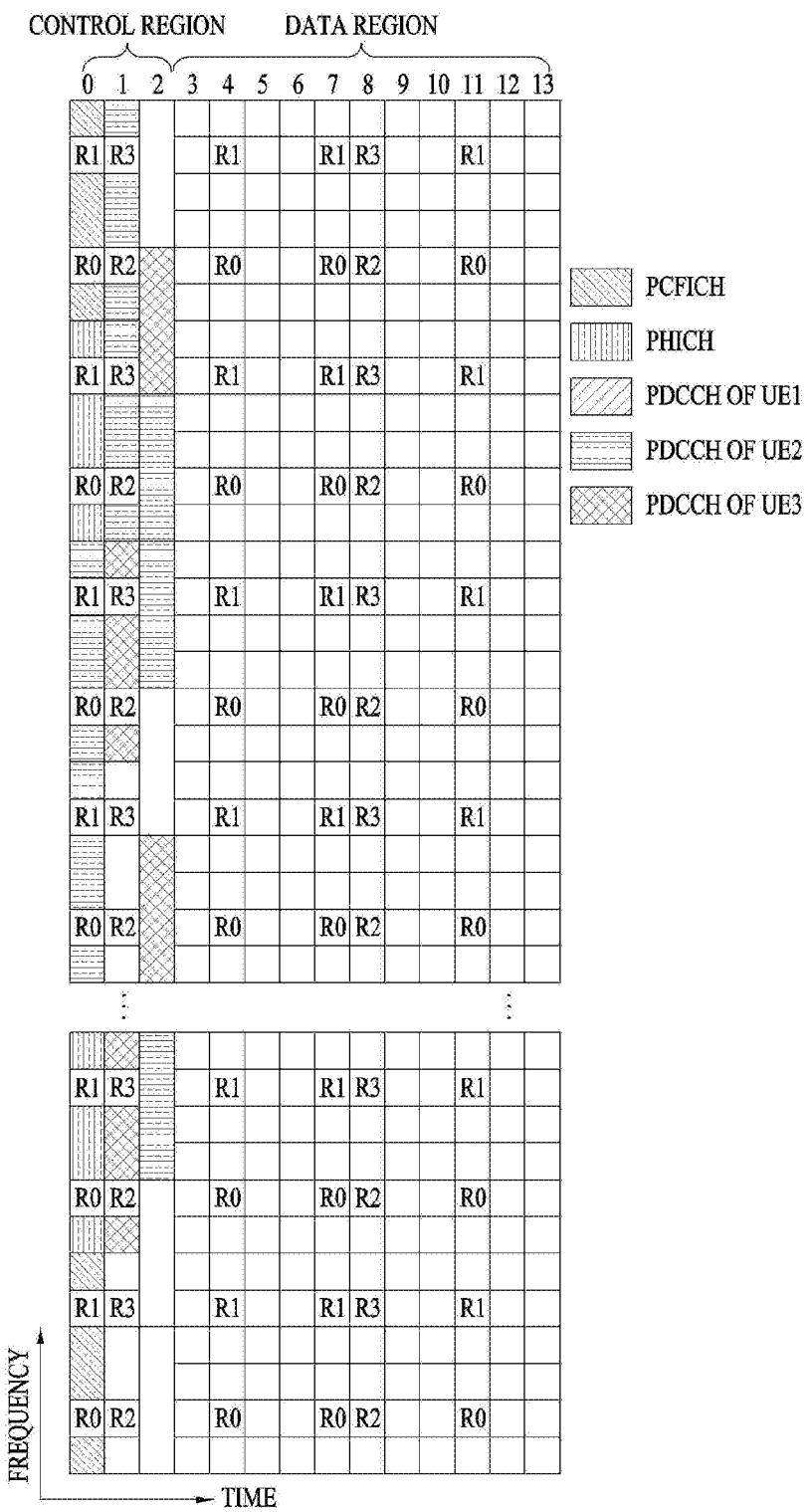
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R0 to R3 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPS K). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
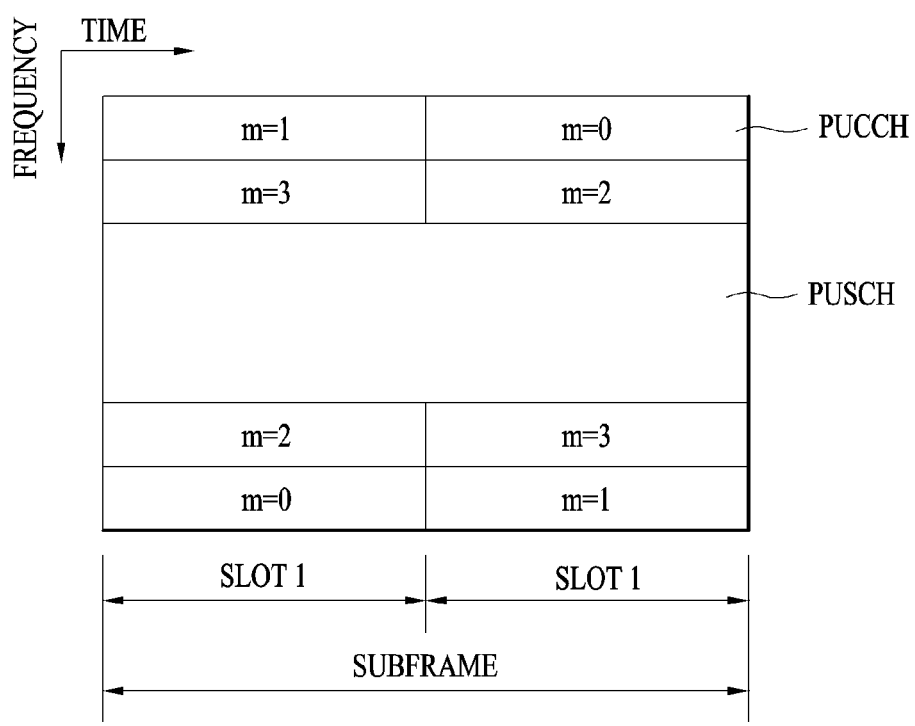
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE and may be reported CSI for each of the CSI processes. In this case, the CSI process includes CSI-RS resource for specifying signal quality and CSI-IM (interference measurement) resource, that is, IMR (interference measurement resource) for interference measurement.

It is expected that the next-generation mobile communication standard, LTE-A will support a coordinated multipoint (CoMP) transmission method, which is not supported in the conventional standard, to increase a data transfer rate.

The CoMP transmission method means that two or more eNBs or cells cooperate in communication with a UE located in a shadowing area to improve communication performance between the UE and an eNB (cell or sector).

The CoMP transmission method may be classified into a cooperative MIMO type of join processing (CoMP-joint processing, CoMP-JP) method based on data sharing and a coordinated scheduling/beamforming (CoMP-coordinated scheduling/beamforming, CoMP-CS/CB) method.

In the case of DL transmission, according to the CoMP-JP method, a UE may simultaneously and instantaneously receive data from base stations participating in CoMP transmission and improve reception performance by combining signals received from the base stations (joint transmission (JT)). In addition, it may be considered that one of the base station participating in the CoMP transmission transmits data to the UE at a specific time (dynamic point selection (DPS)).

On the other hand, according to the CoMP-CS/CB method, the UE may instantaneously receive data from one base station, i.e., a serving base station based on beamforming.

In the case of UL transmission, according to the CoMP-JP method, each base station may simultaneously receive a PUSCH signal from the UE (joint reception (JR)). On the other hand, according to the CoMP-CS/CB method, only one base station may receive a PUSCH. In this case, the use of the CoMP-CS/CB method may be determined by cooperation between cells or base stations.

Recently, the 3GPP LTE-A standard has a PDSCH RE mapping and quasi-co-location indicator (PQI) field in DCI format 2D for transmission mode 10 corresponding to CoMP PDSCH transmission. Specifically, the PQI field has a length of two bits and indicates four states in total. The information indicated by each state is a parameter set for receiving a PDSCH in CoMP transmission, and the values of the field are signaled by higher layers. That is, a total of four parameter sets may be semi-statically signaled through RRC layer signaling, and the PQI field in DCI format 2D may dynamically indicate one of the four parameter sets.

The information included in the parameter sets may contain at least one of the number of CRS antenna ports (crs-PortsCount), a frequency shift value of a CRS (crs-FreqShift), an MBSFN subframe configuration (mbsfn-SubframeConfigList), a zero power (ZP) CSI-RS configuration (cSI-RS-ConfigZPId), a PDSCH start symbol (pdsch-Start), and quasi co-location (QCL) information about a non-ZP (NZP) CSI-RS (qcl-CSI-RS-ConfigNZPId).

Hereinafter, QCL between antenna ports will be described.

The QCL between antenna ports may mean that some or all of the large-scale properties of a signal received by a UE from an antenna port (or a radio channel corresponding to the antenna port) are the same as those of a signal received from another antenna port (or a radio channel corresponding to the other antenna port). In this case, the larger-scale properties may include Doppler spread and shift, which are related to a frequency offset, and average delay and delay spread, which are related to a timing offset. Further, the larger-scale properties may also include average gain.

According to the definition above, the UE may not assume that non-quasi-co-located (NQCL) antenna ports have the same large-scale properties. In this case, the UE needs to independently perform a tracking procedure for obtaining a frequency offset and a timing offset for each antenna port.

For QCL antenna ports, the UE may perform the following operations.

1) The UE may apply a power-delay profile, delay spread, Doppler spectrum, and Doppler spread estimation results of a radio channel corresponding to a specific antenna port to a Wiener filter parameter used to estimate a radio channel corresponding to another antenna port.

2) In addition, the UE may acquire time synchronization and frequency synchronization for the specific antenna port and then apply the same synchronization to other antenna ports.

3) For the average gain, the UE may calculate a reference signal received power (RSRP) measurement value for each of the QCL antenna ports and average the measurement values.

For example, when the UE receives DM-RS based DL data channel scheduling information, for example, DCI format 2C, on a PDCCH (or E-PDCCH), the UE assumes that data demodulation is performed after channel estimation of the PDSCH based on a DM-RS sequence indicated by the scheduling information.

In this case, if a DM-RS antenna port for DL data channel demodulation at the UE is QCL with a CRS antenna port of a serving cell, the UE may apply the large-scale properties of a radio channel, which are estimated from its CRS antenna port, when performing channel estimation using the DM-RS antenna port, thereby improving performance of DM-RS based DL data channel reception.

Similarly, if the DM-RS antenna port for the DL data channel demodulation at the UE is QCL with a CSI-RS antenna port of the serving cell, the UE may apply the large-scale properties of a radio channel, which are estimated from the CSI-RS antenna port of the serving cell, when performing the channel estimation using the DM-RS antenna port, thereby improving the performance of the DM-RS based DL data channel reception.

Since a wavelength becomes short in the field of Millimeter Wave (mmW) in the NR system, a plurality of antenna elements may be installed in the same area. In more detail, a wavelength is 1 cm in a band of 30 GHz, and a total of 64(8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
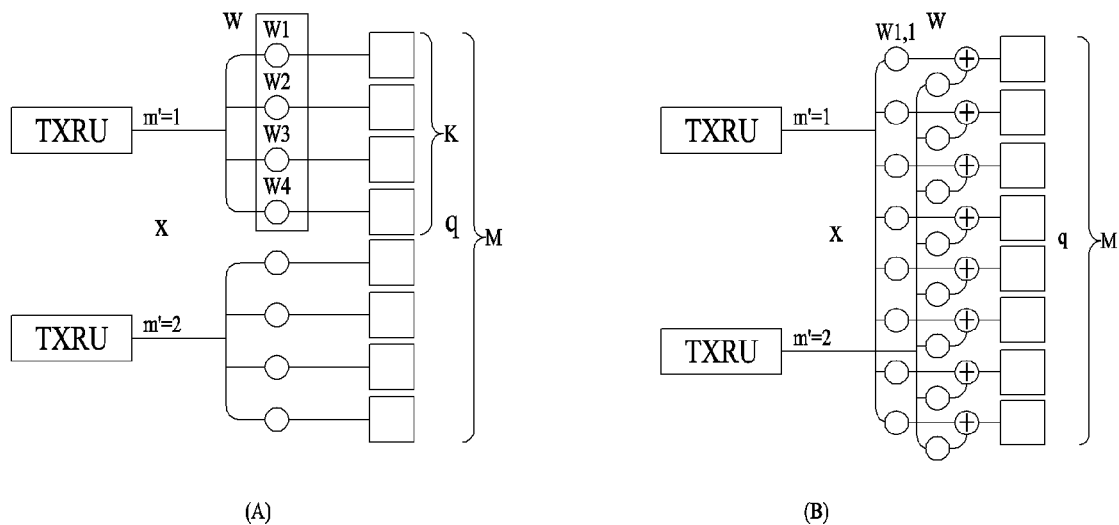
FIG. 7 is a diagram illustrating examples of a connection scheme between TXRUs and antenna elements.

FIG. 7 illustrates examples of a connection scheme between TXRUs and antenna elements.

(A) of FIG. 7 illustrates that TXRU is connected to a sub-array. In this case, the antenna elements are connected to only one TXRU. Unlike (A) of FIG. 7, (B) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as New RAT in the present invention.

Figure 8:
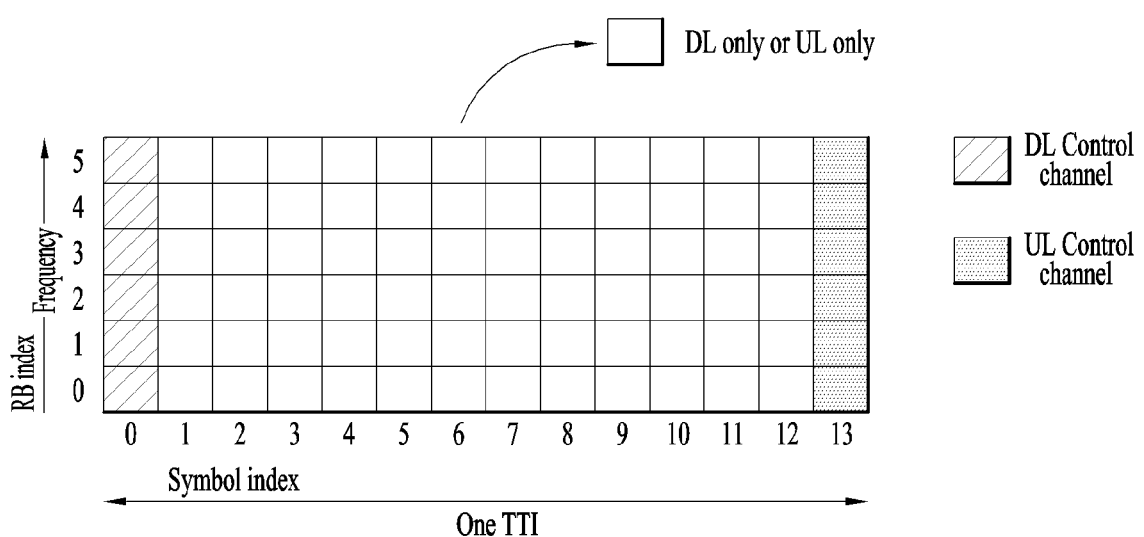
FIG. 8 is a diagram illustrating an example of a self-contained subframe structure.

A self-contained subframe structure shown in FIG. 8 is considered in the fifth generation New RAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period (GP).

Examples of the self-contained subframe type that may be configured in the system operating based on the New RAT may consider four subframe types as follows.

- downlink control period+downlink data period+GP+uplink control period
- downlink control period+downlink data period
- downlink control period+GP+uplink data period+uplink control period
- downlink control period+GP+uplink data period A structure in which the DM-RS is transmitted only in a front OFDM symbol of a slot has been considered in the current NR system. This structure is called "front loaded DM-RS structure". In addition, a structure in which the DM-RS is transmitted not only in a front OFDM symbol of a slot but also in a rear symbol thereof has also been implemented. That is, an additional DM-RS is added to the front loaded DM-RS structure.

The NR system may support a maximum of two codewords (CWs) for data transmission as in the LTE system. In addition, data may be mapped to up to 8 layers and simultaneously transmitted based on multi-antenna transmission, i.e., multi-input multi-output (MIMO) transmission. In this case, CW-to-layer mapping (i.e., which layer is mapped to which CW) needs to be flexible to optimize link adaption for each CW.

A base station may transmit to a UE information on CW-to-layer mapping to be used for data reception, and the UE may feed back information on its preferred CW-to-layer mapping when transmitting channel status information (CSI). Specifically, the base station may provide the CW-to-layer mapping information through RRC layer signaling, MAC layer signaling, DCI, etc. In particular, the base station may provide the CW-to-layer mapping information hierarchically, using two or more types of signaling. For example, as candidate sets, configurable mapping rules between CWs and layers may be provided through RRC layer signaling, and among the candidate sets, a mapping rule to be applied to the CWs and layers may be indicated by DCI. If necessary, first candidate sets may be provided by RRC layer signaling, second candidate sets selected from among the first candidate sets may be provided by MAC layer signaling, and then one of the second candidate sets may be indicated by DCI. By doing so, the mapping rule between the CWs and layers may be dynamically changed without a significant increase in DCI overhead.

CW-to-layer (C2L) mapping candidates may be defined as follows depending on ranks. In the format of (x, y), x denotes the number of layers mapped to CW1, and y denotes the number of layers mapped to CW2.

Rank 5: (2,3), (3,2), (1,4) or (4,1)
Rank 6: (3,3), (4,2) or (2,4)
Rank 7: (3,4) or (4,3)

For example, C2L mapping rule (2, 3) of rank 5 means that among layers 0 to 4, the first two layers, layers 0 and 1 are mapped to CW 1 and the remaining three layers, layers 2 to 4 are mapped to CW 2. C2L mapping rule (3, 2) of rank 5 means that the first three layers, layers 0 to 2 are mapped to CW 1 and the remaining two layers, layers 3 and 4 are mapped to CW 2.

For UE's data reception, the base station may transmit the C2L mapping information (hereinafter referred to as C2L) by indicating a DM-RS port group. For example, when data is transmitted on DM-RS ports 0 to 4 in rank 5, the following may be provided to indicate C2L (2, 3): group 1 is composed of DM-RS ports 0 and 1 and group 2 is composed of DM-RS ports 2 to 4. Then, it may be regulated that CW 1 and CW 2 correspond to group 1 and group 2, respectively.

In the case of C2L (3, 2), it is unnecessary to provide information indicating that DM-RS port group 1 is composed of DM-RS ports 0 to 2 and DM-RS port group 2 is composed of DM-RS ports 3 and 4. That is, it is sufficient to provide that DM-RS port group 1 is composed of DM-RS ports 0 and 1 and DM-RS port group 2 is composed of DM-RS ports 2 to 4 as in C2L (2, 3). This is because the base station is capable of supporting both C2L (3, 2) and C2L (2, 3) in a UE-transparent manner by switching data control information for CW 1 (e.g., MCS, NDI, RV, etc.), which is transmitted in DCI, with data control information for CW 2. In other words, it may be regulated either C2L (1, k) or C2L (k, l) is signaled, thereby reducing control information overhead.

Meanwhile, two types of DM-RS port groups may be defined. Type 1 DM-RS port group includes DM-RS ports to which the same QCL and rate-matching are applied, and type 2 DM-RS port group includes DM-RS ports for layers mapped to the same CW. For example, when three TPs (TPs 1 to 3) perform DL transmission with a total of 7 ranks based on independent layer joint transmission (ILJT), TP 1, TP 2, and TP 3 may transmit data with rank 2, rank 2, and rank 3, respectively. TP 1 and TP 2 may transmit different layers corresponding to the same CW, and TP 3 may transmit a layer corresponding to the other CW.

In this case, as type 1 DM-RS port groups, DM-RS port groups for TP 1 to TP 3 may be defined as follows: {DM-RS port group 1=DM-RS port 0 and DM-RS port 1}, 1DM-RS port group 2=DM-RS port 2 and DM-RS port 31, and 1DM-RS port group 1=DM-RS port 4 to DM-RS port 61. The base station may inform the UE of the DM-RS port groups through DCI. As type 2 DM-RS port groups, DM-RS port groups may be defined as follows: {DM-RS port group 1=DM-RS port 0 to DM-RS port 3} and {DM-RS port group 2=DM-RS port 4 to DM-RS port 6}. The base station may also inform the UE of the DM-RS port groups through DCI.

Alternatively, the base station may transmit information on type 1 DM-RS port groups to the UE and then inform the UE how type 1 DM-RS port groups are mapped to type 2 DM-RS port groups. For example, type 1 DM-RS port group 1 and type 1 DM-RS port group 2 may be mapped to type 2 DM-RS port group 1, and type 1 DM-RS port group 3 may be mapped to type 2 DM-RS port group 2.

The base station may inform the UE of the DM-RS port group type. That is, when the base station indicates type 1, different QCL and rate-matching may be applied for each DM-RS port group, and C2L mapping may be determined according to a predetermined C2L mapping rule, regardless of DM-RS port groups. When the base station indicates type 2, the DM-RS port groups are one-to-one matched with CWs, and the same QCL and rate-matching may be applied regardless of the DM-RS port groups. The type 1 DM-RS port group and the type 2 DM-RS port group may be indicated at the same time. In this case, different QCL and rate-matching may be applied for each DM-RS port group, and each DM-RS port group may be mapped to a different CW.

The type 2 DM-RS port group may be used for flexible C2L mapping when there is a single TP. That is, when one TP transmits one piece of DCI and one PDSCH corresponding thereto, the UE may be informed two type 2 DM-RS port groups. In this case, it may be defined that type 2 DM-RS port group 1 and type 2 DM-RS port group 2 correspond to CW 1 and CW 2, respectively. Accordingly, MCS/RV/NDI, which is control information for each CW in the DCI, may be divided into MCS/RV/NDI for group 1 and MCS/RV/NDI for group 2. That is, when receiving data for DM-RS port group 1, the UE may use the MCS/RV/NDI for DM-RS port group 1. When receiving data for DM-RS port group 2, the UE may use the MCS/RV/NDI for DM-RS port group 2. Since only the single TP participates in the transmission, it is assumed that all DM-RS ports are QCL with the same CSI-RS.

Hereinafter, a description will be given of a method in a CoMP ILJT environment where three TPs exist. However, the method is applicable to a CoMP JT environment where N TPs exist or a non-CoMP environment. First, RS settings, report settings, and options for configuring a connection therebetween will be described. Then, UE's CSI feedback will also be described for each option.

<Option 1>
RS setting
RS setting 1: (CSI-RS 1, IMR 1) for TP 1
RS setting 2: (CSI-RS 2, IMR 2) for TP 2
RS setting 3: (CSI-RS 3, IMR 3) for TP 3
Report setting
Report setting 1: RI 1, PMI 1, CQI, RI-to-CW mapping
Report setting 2: RI 2, PMI 2
Report setting 3: RI 3, PMI 3

Relationship between RS setting and report setting
RS setting 1—report setting 1
RS setting 2—report setting 2
RS setting 3—report setting 3

Each TP has its own RS setting, and each RS setting is one-to-one connected to each report setting. In this case, a representative report setting, report setting 1 may additionally include a CQI and RI-to-CW mapping. When the base station separately indicates that the configuration according to option 1 is for CSI measurement and reporting for the ILJT/CoMP, the UE may measure and report CoMP CSI according to the following method. In other words, the base station indicates that reporting settings 1 to 3 are for the CoMP transmission, and in this case, CSI calculation needs to be performed according to the following method. In addition, the base station may configure the representative report setting among the report settings and allow the representative report setting to be used for reporting the CQI and RI-to-CW mapping.

When aperiodic CSI reporting is triggered, the RI-to-CW mapping may be transmitted together with CSI. In the case of periodic CSI reporting, the RI-to-CW mapping may be transmitted with the same periodicity as that of an RI. Alternatively, the periodicity of the RI-to-CW mapping may be set to a multiple of that of the RI so that the RI-to-CW mapping may be reported with a long-term period. The base station may indicate an independent subframe offset to avoid a collision with other CSI. Alternatively, the offset may be fixed (e.g., offset=0). Accordingly, when a collision occurs, two pieces of CSI may be joint-encoded, or CSI-RS aggregation information may be reported with high priority. Further, the base station may inform the UE of the RI-to-CW mapping, and the UE may calculate CSI based on the RI-to-CW mapping.

The UE may calculate optimal CSI by assuming that the ILJT is performed on individual channels corresponding to CSI-RSs 1 to 3. In this case, the number of layers for a channel corresponding to CSI-RS i and the PMI therefor are reported as RI i and PMI respectively. In the case of the CQI, a CQI value obtainable when data, where RI i and PMI i are applied, is transmitted simultaneously on each channel corresponding to CSI-RS i may be calculated. Since one CQI is present for each CW, a maximum of two CQIs may be reported. When the total rank is 4 or lower, the number of CQIs may be 1 since a single CW is used. When the total rank is 5 or higher, the number of CQIs may be 2 since two CWs are used. In this case, the total rank may mean all ranks transmitted in JT.

When the total rank is 5 or higher, it should be noted which TP's layer belongs to which CW since two CWs are used. To this end, a RI-to-CW mapping indicator is required. For example, when the total rank is 5 and RI 1, RI 2, and RI 3 are 2, 2, and 1, respectively, the UE may inform that the TP 1 transmits CW 1 with rank 2 and TP 2 and TP 3 transmit CW 2 with rank 3 by reporting that the number of layers transmitted by TP 1, RI 1 is mapped to CW 1 and RI 2 and RI 3 are mapped to CW 2. Alternatively, when the total rank is 5 and RI 1, RI 2, and RI 3 are 2, 2, and 1, respectively, the UE may inform that TP 1 and TP 2 transmit CW 1 with rank 4 and TP 3 transmits CW 2 with rank 1 by reporting that RI 1 and RI 2 are mapped to CW 1 and RI 3 is mapped to CW 2.

Based on the RI-to-CW mapping, in the case of CQI 1 (i.e., a CQI corresponding to CW 1), the CQI is calculated based on an SINR obtained by assuming as many layers as the RI connected to CW 1 as desired layers and the remaining layers as interference. In the case of CQI 2 (i.e., a CQI corresponding to CW 2), the CQI is calculated based on an SINR obtained by assuming as many layers as the RI connected to CW 2 as desired layers and the remaining layers as interference.

Although it is assumed that two CWs are used in rank 5 or higher, the CQI may be defined for each CSI-RS transmitted by each TP participating in non-coherent (NC) JT, regardless of the total rank. Accordingly, RI i, PMI i, and CQI i are defined and reported for CSI-RS i in option 1 where the three TPs participate in the NC JT.

CQI i means a CQI obtainable when as many layers as RI i are transmitted on the channel corresponding to CSI-RS i through precoding of PMI i. In this case, the CQI calculation is performed by assuming that regarding interference signals, as many layers as RI j are transmitted on a channel corresponding to CSI-RS j, i.e., the remaining CSI-RSs except CSI-RS i through precoding of PMI j. For example, CQI 1 is calculated by assuming that regarding an interference signal, as many layers as RI 2 are transmitted on a channel corresponding to CSI-RS 2 through precoding of PMI 2 and regarding an additional interference signal, as many layers as RI 3 are transmitted on a channel corresponding to CSI-RS 3 through precoding of PMI 3. Although this proposal is described based on option 1, the proposal is also applicable to other options.

Considering that the RI-to-CW mapping indicator is additionally required when the total rank is 5 or higher, the following method may be used to prevent control channel overhead from increasing due to the RI-to-CW mapping indicator.

When the total rank is 5 or higher, the UE may set only two RIs to non-zero values and other RIs to zero. Since the two RIs have non-zero values, CWs may be one-to-one mapped to non-zero RI layers at all times, and thus, no RI-to-CW mapping indicator may be required. Alternatively, when the total rank is 5 or higher, the UE may set up to two RIs to non-zero values. That is, there may be one or two non-zero RIs. When there is one non-zero RI, the C2L mapping in the legacy LTE system may be applied. When there are two non-zero RIs, CWs may be one-to-one mapped to non-zero RI layers at all times.

Although the present disclosure is described on the assumption that two CWs are used in rank 5 or higher, the disclosure may be equally applied when two CWs are used in rank N or higher by substituting rank 5 with rank N. In addition, the present disclosure is described on the assumption that a maximum of two CWs are used to transmit one data signal, the disclosure may be applied when a maximum of three CWs are used for transmission. In this case, information on RI-to-CW mapping may not be required, and RI i may be mapped to CW i in a fixed manner. The CQI calculation method according to option 1 may be equally applied to other options.

The UE may feed back that TP i does not participate in CoMP transmission by reporting that specific RI i has a value of 0. If up to two TPs are configured to participate in the CoMP transmission in consideration of system complexity, the UE may be limited to feed back up to two non-zero RIs among multiple RIs (i.e., RI 1, RI 2, RI 3, etc.).

Considering that multiple RIs are reported in option 1 and other options, there may be waste in payload if each RI is fed back using a separate field. Thus, the multiple RIs may be joint-encoded and fed back. Assuming that the maximum value of each of RI 1 and RI 2 is 2 and feedback is provided using a separate field, 4 bits are required since RI 1={0,1,2} and RI 2={0,1,2}. However, when joint encoding is performed, a total of 3 bits are required to represent the following 8 states: (0,1), (0,2), (1,0), (1,1), (1,2), (2,0), (2,1), and (2,2). In addition, considering that PMI i is meaningless when RI i=0, the UE may be configured to transmit a random PMI value or fix the PMI value to 0. Alternatively, the UE may save a UL control channel resource instead of transmitting PMI i.

When the JT is applied, one TP may be restricted to use only one CW. This is because an SINR difference between TPs having different geometry is higher than an SINR difference between multiple layers transmitted by one TP. In other words, if multiple layers mapped to the same CW have similar SINRs, performance may be improved. Thus, when the JT is applied, one TP may be restricted to use only one CW. The maximum value of RI i may be limited to 4. The above restriction may be equally applied to other options of the present disclosure.

If one RI among reported RIs has a non-zero value and other RIs are zero, dynamic point selection (DPS) transmission for single-point transmission may be assumed instead of the JT. Accordingly, in this case, the maximum limitation on the RI may be relaxed so that up to rank 8 may be reported.

To configure a different rank restriction and a different codebook restriction for each TP, a codebook subset restriction (CSR) needs to be configured separately for each RI and PMI.

<Option 2>
RS setting
RS setting 1: (CSI-RS 1, IMR 1) for TP 1
RS setting 2: (CSI-RS 2, IMR 2) for TP 2
RS setting 3: (CSI-RS 3, IMR 3) for TP 3
Report setting
Report setting 1: RI 1, PMI 1, RI 2, PMI 2, RI 3, PMI 3, CQI, RI-to-CW mapping
Relationship between RS setting and report setting
RS settings 1, 2, 3—report setting 1

In contrast to option 1, multiple RS settings are connected to one report setting in option 2. However, the CSI calculation and reporting of option 2 are performed in the same way as those of option 1.

<Option 3>
RS setting
RS setting 1: (CSI-RS 1, IMR 1) for TP 1
RS setting 2: (CSI-RS 2, IMR 2) for TP 2
RS setting 3: (CSI-RS 3, IMR 3) for TP 3
Report setting
Report setting 1: CRI 1, CRI 2, RI 1, PMI 1, RI 2, PMI 2, CQI
Relationship between RS setting and report setting
RS settings 1, 2, 3—report setting 1

Due to the system complexity, the number of TPs that simultaneously participates in the CoMP transmission may be limited to 2. Accordingly, the UE may select a maximum of two TPs from among the three TPs and calculate and feed back CSI in 2-TP CoMP transmission. The two TPs may be selected based on CRI 1 and CRI 2, respectively. RI i and PMI i may indicate a rank and a PMI applied to a channel corresponding to a CSI-RS selected by CRI i. After selecting the TPs participating in the JT using the CRIs, the UE may calculate a CQI obtainable when the corresponding TPs participate in the JT as described in option 1. That is, in the case of the CQI, a CQI value obtainable when data, where RI i and PMI i are applied, is transmitted simultaneously on each channel corresponding to CSI-RS i may be calculated.

When the sum of RI 1 and RI 2 is more than or equal to 5, two CWs may be transmitted. Since the two RIs are used in option 3, the CQI may be calculated by mapping the RIs to the CWs one by one as follows: RI 1->CW 1 and RI 2->CW 2. Specifically, in the case of CQI 1 (i.e., the CQI corresponding to CW 1), the CQI is calculated based on an SINR obtained when RI 1 layers to which PMI 1 is applied are transmitted as desired layers on a channel corresponding to a CSI-RS selected by CRI 1 and RI 2 layers to which PMI 2 is applied are transmitted as interference layers on a channel corresponding to a CSI-RS selected by CRI 2.

In the case of CQI 2 (i.e., the CQI corresponding to CW 2), the CQI is calculated based on an SINR obtained when the RI 2 layers to which PMI 2 is applied are transmitted as desired layers on the channel corresponding to the CSI-RS selected by CRI 2 and the RI 1 layers to which PMI 1 is applied are transmitted as interference layers on the channel corresponding to the CSI-RS selected by CRI 1.

Further, RI 1 is configured to be more than or equal to RI 2 at all times. As a result, it is not necessary to distinguish between C2L (1, k) and C2L (k, 1), thereby reducing feedback overhead. The UE may select the CRI such that RI 1 of CRI 1 is more than or equal to RI 2 of CRI 2.

<Option 4>
RS setting
RS setting 1: (CSI-RS 1, IMR 1) for TP 1
RS setting 2: (Aggregated CSI-RS 2, IMR 2) for TP 2 and TP 3
Report setting
Report setting 1: RI 1, PMI 1, RI 2, PMI 2, CQI
Relationship between RS setting and report setting
RS settings 1, 2—report setting 1

In option 4, although the three TPs participate in the JT, TP 2 and TP 3 perform coherent JT where the same layers are transmitted, and TP 1 performs the ILJT with TP 2 and TP 3. The base station may configure CSI-RS 2 composed of N2+N3 CSI-RS ports in RS setting 2 by aggregating N2 CSI-RS ports and N3 CSI-RS port transmitted from TP 2 and TP 3. Thus, the UE may obtain channel information corresponding to when TP 2 and TP 3 perform the coherent JT, from CSI-RS 2 (in a UE-transparent manner). In the case of the CQI, a CQI value obtainable when data, where RI i and PMI i are applied, is transmitted simultaneously on each channel corresponding to CSI-RS i may be calculated.

When the sum of RI 1 and RI 2 is more than or equal to 5, two CWs may be transmitted. Since the two RIs are used, the CQI may be calculated by mapping RI 1 and RI 2 to CW 1 and CW 2, respectively. Specifically, CQI 1 (i.e., the CQI corresponding to CW 1) may be calculated based on an SINR obtained when RI 1 layers to which PMI 1 is applied are transmitted as desired layers on a channel corresponding to CSI-RS 1 and RI 2 layers to which PMI 2 is applied are transmitted as interference layers on a channel corresponding to CSI-RS 2.

CQI 2 (i.e., the CQI corresponding to CW 2) may be calculated based on an SINR obtained when the RI 2 layers to which PMI 2 is applied are transmitted as desired layers on the channel corresponding to CSI-RS 2 and the RI 1 layers to which PMI 1 is applied are transmitted as interference layers on the channel corresponding to CSI-RS 1.

<Option 5>
RS setting
RS setting 1: (CSI-RS 1, IMR 1) for TP 1
RS setting 2: (CSI-RS 2, IMR 2) for TP 2
RS setting 3: (CSI-RS 3, IMR 3) for TP 3
Report setting
Report setting 1: RI 1, PMI 1, RI 2, PMI 2, CQI, CSI-RS aggregation information
Relationship between RS setting and report setting
RS settings 1, 2, 3—report setting 1

The UE may select CSI-RSs to be aggregated from among the three CSI-RSs and then regenerate a total of two CSI- RSs. For example, the UE may regenerate CSI-RS 1' by aggregating CSI-RS 1 and CSI-RS 2 and regenerate CSI-RS 2' using CSI-RS 3. CSI-RS 1' and CSI-RS 2' may indicate channels transmitted from virtual TP 1 and virtual TP 2, respectively. The UE may calculate and report CSI obtainable when virtual TP 1 and virtual TP 2 participate in the ILJT. That is, the UE may calculate the CQI by assuming that data to which RI 1 and PMI 1 are applied is transmitted on a channel corresponding to CSI-RS 1' and data to which RI 2 and PMI 2 are applied is transmitted on a channel corresponding to CSI-RS 2'.

When the sum of RI 1 and RI 2 is more than or equal to 5, two CWs may be transmitted. Since the two RIs are used, the CQI may be calculated by mapping the RIs to the CWs one by one as follows: RI 1->CW 1 and RI 2->CW 2. Specifically, CQI 1 (i.e., the CQI corresponding to CW 1) may be calculated based on an SINR when RI 1 layers to which PMI 1 is applied are transmitted as desired layers on a channel corresponding to CSI-RS 1' and RI 2 layers to which PMI 2 is applied are transmitted as interference layers on a channel corresponding to CSI-RS 2'.

CQI 2 (i.e., the CQI corresponding to CW 2) may be calculated based on an SINR obtained when the RI 2 layers to which PMI 2 is applied are transmitted as desired layers on the channel corresponding to CSI-RS 2' and the RI 1 layers to which PMI 1 is applied are transmitted as interference layers on the channel corresponding to CSI-RS 1'.

In addition, the UE may report to the base station the CSI-RS aggregation information together with the CSI. When the aperiodic CSI reporting is triggered, the CSI-RS aggregation information may be transmitted together with CSI. In the case of the periodic CSI reporting, the CSI-RS aggregation information may be transmitted with the same periodicity as that of the RI. Alternatively, the periodicity of the CSI-RS aggregation information may be set to a multiple of that of the RI so that the CSI-RS aggregation information may be reported with a long-term period. The base station may indicate an independent subframe offset to avoid a collision with other CSI. Alternatively, the offset may be fixed (e.g., offset=0). Accordingly, when a collision occurs, two pieces of CSI may be joint-encoded or the CSI-RS aggregation information may be reported with high priority.

<Option 6>

RS setting

RS setting 1: (CSI-RS 1, IMR 1) for TP 1

RS setting 2: (CSI-RS 2, IMR 2) for TP 2

RS setting 3: (CSI-RS 3, IMR 3) for TP 3

Report setting

Report setting 1: RItot, RI 1, PMI 1, RI 2, PMI 2, CQI

Relationship between RS setting and report setting

RS settings 1, 2, 3—report setting 1

When the three TPs participate in the ILJT, the UE may report information the total rank (RItot), the rank (RI 1) and PMI (PMI 1) of CW 1 (RI 1), and the rank (RI 2) and PMI (PMI 2) of CW 2. Considering that two CWs are used only when the total rank is 5 or higher, only RI 1 and PMI 1 are valid when RItot is less than or equal to 4. In this case, RI 2=0 or null, and PMI 2=null.

However, since the RI applied to each CSI-RS is unclear, the reported information may be insufficient. For example, when it is reported that RItot=5, RI 1=3, and RI 2=2, the ranks of CSI-RSs 1, 2, and 3 may be (3, 1, 1), (1, 2, 2), or (2, 1, 2).

<Option 7>

RS setting

RS setting 1: (CSI-RS 1, IMR 1) for TP 1

RS setting 2: (CSI-RS 2, IMR 2) for TP 2

Report setting

Report setting 1: RI 1, PMI 1, RI 2, PMI 2, CQI

Relationship between RS setting and report setting

RS settings 1, 2—report setting 1

In option 7, two TPs may participate in the ILJT.

The UE may calculate optimal CSI when the ILJT is performed on channels corresponding to CSI-RSs 1 and 2. In this case, the number of layers for a channel corresponding to CSI-RS i and the PMI therefor are reported as RI i and PMI i, respectively. In the case of the CQI, a CQI value obtainable when data, where RI i and PMI i are applied, is transmitted simultaneously on each channel corresponding to CSI-RS i may be calculated.

When the sum of RI 1 and RI 2 is more than or equal to 5, two CWs may be transmitted. Since the two RIs are used, the CQI may be calculated by mapping the RIs to the CWs one by one as follows: RI 1->CW 1 and RI 2->CW 2. Specifically, CQI 1 (i.e., the CQI corresponding to CW 1) may be calculated based on an SINR obtained when RI 1 layers to which PMI 1 is applied are transmitted as desired layers on a channel corresponding to a CSI-RS 1 and RI 2 layers to which PMI 2 is applied are transmitted as interference layers on a channel corresponding to CSI-RS 2.

CQI 2 (i.e., the CQI corresponding to CW 2) may be calculated based on an SINR obtained when the RI 2 layers to which PMI 2 is applied are transmitted as desired layers on the channel corresponding to CSI-RS 2 and the RI 1 layers to which PMI 1 is applied are transmitted as interference layers on the channel corresponding to CSI-RS 1.

To implement the NC JT, each transmission and reception point (TRP) may be configured to transmit a different PDSCH and different DCI at the same time. Alternatively, multiple TRPs may be configured to transmit one PDSCH, and among the multiple TRPs, a representative TRP may be configured to transmit DCI for the PDSCH. The former is referred to as multi-DCI based NC JT, and the latter is referred to as single-DCI based NC JT.

In the single-DCI based NC JT, the RI of one PDSCH reported by the NC JT may be determined as the sum of RIs reported based on report settings for the NC JT. Thus, the number of PDSCH CWs may correspond to the sum of the RIs reported based on the report settings for the NC JT. If the sum of the RIs is less than or equal to N (for example, N=4), one CW may be used. Otherwise, the UE may calculate the CSI by assuming two CWs.

In the multi-DCI based NC JT, when there are N non-zero RIs among multiple RIs reported based on the report settings for the NC JT, the CSI may be calculated on the assumption of N CWs. For example, when there are two non-zero RIs, RI to CW mapping may be performed one by one as follows: RI 1=CW 1 and RI 2=CW 2. In this case, the maximum value of each RI is limited to 4.

According to the above proposal, the UE may calculate the CSI by assuming different C2L mapping depending on either the single-DCI based NC JT or the multi-DCI based NC JT. Therefore, the base station needs to inform the UE of either the single-DCI based NC JT or the multi-DCI based NC JT. To this end, the following method is proposed.

In the case of the single-DCI based NC JT, the base station may configure one report setting and connect a CSI-RS resource transmitted by each TRP to the report setting. In the case of the multi-DCI based NC JT, the base station may configure N report settings corresponding to N TRPs participating in the NC JT and connect N CSI-RS resources transmitted by the N TRPs to the N report settings one by one.

Basically, each TRP participating in the NC JT transmits a different data layer on the same time-frequency resources. This is referred to as a fully overlapped (overlapping) case. Meanwhile, in evolved NC JT, data transmitted by each TRP may overlap in some time-frequency resources but may not overlap in other time-frequency resources. For example, when TP 1 transmits data in RBs 1 and 2 and TP 2 transmits data in RBs 2 and 3, RB 2 is commonly used by the two TPs for data transmission, but RBs 1 and 3 are used by TP 1 and TP 2, respectively. This is referred to as a partially overlapped (overlapping) case.

The UE may obtain different CSI depending on whether the UE assumes the fully overlapped case or the partially overlapped case. When the base station schedules the fully overlapped case, the base station needs to receive the CSI obtained by assuming the fully overlapped case. On the contrary, when the base station schedules the partially overlapped case, the base station needs to receive the CSI obtained by assuming the partially overlapped case. Thus, the base station should inform the UE whether the UE assumes the fully overlapped case or the partially overlapped case for the CSI calculation. In particular, when the partially overlapped case is used, the base station should inform how many time-frequency resources overlap and how the time-frequency resources overlap. Simply, the UE may autonomously select one of the assumptions and report to the base station which assumption the UE uses. Further, the base station may configure the assumption through a report setting or indicate the assumption using an aperiodic CSI reporting triggering filed in DCI.

To this end, the base station may transmit the CSI-RS in some RBs. For the fully overlapped case, TP 1 and TP 2 may transmit CSI-RSs in the same frequency regions (e.g., RBs). For the partially overlapped case, TP 1 and TP 2 may transmit CSI-RSs in partially overlapping regions (e.g., RBs). Specifically, TP 1 may transmit CSI-RS 1 in RBs 1 and 2, and TP 2 may transmit CSI-RS 2 in RBs 2 and 3. When calculating the CSI, the UE may assume that RB 2 where the CSI-RSs overlap includes data transmitted from both TP 1 and TP 2, RB 1 where no CSI-RS overlaps includes data transmitted from TP 1, and RB 2 where no CSI-RS overlaps includes data transmitted from TP 2. That is, the base station may perform resource allocation for NC JT data in advance and then, each TP may determine its CSI-RS transmission frequency region based on the resource allocation. Since the resource allocation is dynamically changed, an aperiodic CSI-RS needs to be used.

The base station may inform the UE of a partial-band CSI-RS, interference to a partial band, or a channel measurement restriction (MR) through RRC signaling as follows.

Report setting 0 (R-band=RB{0})—resource setting 0 (CSI-RS 0, RS band=RB{0,1})
Report setting 1 (R-band=RB{2})—resource setting 1 (CSI-RS 1, RS band=RB{1,2})
Report setting 2 (R-band=RB{1})—resource setting 0 & resource setting 1

To receive CSI obtained when it is assumed that TP 0 related to CSI-RS 0 transmits data in RB 0, TP 1 related to CSI-RS 1 transmits data in RB 2, and TP 0 and TP 1 simultaneously transmit data in RB 1, the base station informs the UE of the above configuration. The UE reports CSI for RB 0 based on report setting 0 and measures a channel using CSI-RS 0 transmitted in RBs 0 and 1. Although no IMR is included in the resource setting, an IMR may be configured together with the RS band in a similar way to the CSI-RS.

The UE reports CSI for RB 2 based on report setting 1 and measures a channel using CSI-RS 1 transmitted in RBs 1 and 2. Although no IMR is included in the resource setting, an IMR may be configured together with the RS band in a similar way to the CSI-RS.

The UE reports CSI for RB 1 based on report setting 2 and measures a channel using CSI-RS 0 transmitted in RBs 0 and 1 and CSI-RS 1 transmitted in RBs 1 and 2. In other words, the UE reports the CSI by assuming that TP 0 and TP 1 simultaneously transmit data. Although no IMR is included in the resource setting, an IMR may be configured together with the RS band in a similar way to the CSI-RS.

The UE may calculate and report the CSI independently for each of the three report settings. Upon receiving the CSI, the base station may transmit a different PDSCH for each of RBs 0 to 2 and also transmit different DCI for each PDSCH. In other words, the base station may transmit three PDSCH and three pieces of DCI. However, to prevent DCI overhead from increasing, the base station may transmit two PDSCHs and two pieces of DCI by transmitting one PDSCH and a piece of DCI (one DCI/PDSCH pair) for each TP. Alternatively, the base station may transmit one PDSCH and one piece of DCI.

When the base station transmits the two PDSCHs and the two pieces of DCI by transmitting one DCI/PDSCH pair for each TP, since CSI for the same PDSCH needs to be reported in report settings 0 and 2, each of which including CSI-RS 0 configured in the corresponding resource setting, at least RIs and CQIs to be reported should have the same values. However, since the interference environment varies depending on the RB simultaneously used by the two TPs for the data transmission, PMIs may have different values. To reduce CSI reporting overhead, W1 of the PMI may be set to the same value, and W2 thereof may be set to different values. Similarly, since the CSI for the same PDSCH needs to be reported in report settings 1 and 2, each of which including CSI-RS 1 configured in the corresponding resource setting, at least RIs and CQIs to be reported should have the same values. Accordingly, at least the RIs and CQIs to be reported based on report settings 0, 1, and 2 should have the same values.

When the same CSI values are reported, the UE may report only the CSI value for a representative report setting (e.g., a report setting with the lowest index) to reduce control channel overhead and drop the CSI values for the remaining report settings.

Similarly, when the base station transmits the one PDSCH and the one piece of DCI, at least the RIs and CQIs to be reported based on report settings 0, 1, and 2 should have the same values. To this end, when transmitting the report setting, the base station may inform the UE whether the UE will report independent CSI by independently interpreting each of report settings 0, 1, and 2 or calculate one piece of CSI based on dependency. If the dependency is configured for specific CSI (the specific CSI may mean one of the RI, PMI, CQI, CRI, etc.), the UE may calculate the CSI by considering the dependency. For example, if report settings 0 and 1 have the dependency, the UE may calculate and report CSI obtainable when data is received in RB 0 based on CSI-RS 0 and at the same time, data is received in RB 2 based on CSI-RS 1. As another example, when report settings 0, 1, and 2 have the dependency, the UE may calculate and report CSI obtainable when data is received in RB 0 based on CSI-RS 0, data is received in RB 2 based on CSI-RS 1, and at the same time, data is received in RB 1 based on CSI-RSs 0 and 1.

Alternatively, in the case of report setting 0, the UE may report CSI obtainable when data is received on a channel corresponding to CSI-RS 0 transmitted in RB 0. In the case of report setting 1, the UE may report CSI obtainable when data is received on a channel corresponding to CSI-RS 1 transmitted in RB 2. In the case of report setting 2, the UE may report CSI obtainable when different data layers are received on channels corresponding to CSI-RSs 2 and 3 transmitted in RB 1. In this case, the base station may set the ports and RE patterns of CSI-RSs 2 and 3 equal to those of CSI-RSs 0 and 1, respectively.

Report setting 0—resource setting 0 (CSI-RS 0, RS band=RB{0})
Report setting 1—resource setting 1 (CSI-RS 1, RS band=RB{2})
Report setting 2—resource setting 2 (CSI-RS 2 (with same pattern as CSI-RS 0), CSI-RS 3 (with same pattern as CSI-RS 1), RS band=RB {1})

Although the CSI-RS frequency allocation is limited to specific RBs in the above proposals, actual multi-TRP resource allocation may be different from the CSI-RS frequency allocation. That is, the CSI-RS frequency allocation is only for the CSI calculation, and the final data scheduling of the base station may be different from the CSI-RS frequency allocation. For example, even though the base station receives CSI on a channel measured based on a CSI-RS transmitted on a specific narrow band, the base station may perform wideband scheduling for the UE using the received CSI.

As another method, the base station may inform the UE of an interference power scaling factor (IF). When calculating the SINR for CQI determination, the UE may scale interference layer power by the value of the IF. For example, assuming that TP 1 and TP 2 transmit CSI-RS 1 and CSI-RS 2, respectively and RI 1=m and RI 2=n, the total rank of the NC JT may be n+m. In this case, TP 1 may transmit m-layer transmission, and the SINRs of the layers may be SINR11, SINR12, . . . , and SINR1m. TP 2 may transmit n-layer transmission, and the SINRs of the layers may be SINR21, SINR22, SINR2n.

The denominator of SINR1i for an i-th layer of TP 1 may be composed of interference and noise. The interference may include the remaining layers of TP 1 except the i-th layer of TP 1 and all layers of TP 2, and the noise may include interference from neighboring cells that do not participate in the CoMP transmission besides Gaussian noise. When the CSI is calculated, the interference power from the layers of TP 2 may be scaled by the IF value. In the fully overlapped case, IF=1, and in the partially overlapped case, the condition of 0<IF<1 is satisfied. Similarly, in SINR2i for an i-th layer of TP 2, interference may include the remaining layers of TP 2 except the i-th layer of TP 2 and all layers of TP 1. For the CSI calculation, the interference power from the layers of TP 1 may be scaled by the IF value.

As a further method, in the partially overlapped case, although the CSI-RS is transmitted over the whole band, the base station may indirectly know a PDSCH transmission region assumed for the CSI calculation by restricting the channel measurement range and informing the UE of the restricted channel measurement range. For example, although CSI-RSs 0 and 1 are transmitted over the whole band, the MR may be indicated such that RBs 0 and 1 are used in report setting 0 related to CSI-RS 0 and RBs 1 and 2 are used in report setting 1 related to CSI-RS 1. As a result, the UE may calculate the CSI by assuming that TP 0 transmits a data layer in RB 0, TP 1 transmits a data layer in RB 2, and both TPs 0 and 1 transmit data layers in RB 1. A codebook to be reported (i.e., PMI) may be configured independently for each report setting.

For example, when TP 0 performs multi-user MIMO (MU-MIMO) for its cell while participating in the JT, a type 2 codebook may be configured for report setting 0. Meanwhile, when TP 1 does not perform the MU-MIMO, a type 1 codebook may be configured for report setting 0. Since there are various type 1 codebooks, either a multi-panel codebook or a single-panel codebook may be independently configured. To simplify the operation of the base station and reduce the implementation complexity of the UE for the CSI calculation, it may be regulated that type 2 is not configured for a report setting for CoMP.

The base station may inform the UE which one of the fully overlapped NC JT and the partially overlapped NC JT is used through higher layer signaling, and the UE may calculate and report CSI feedback based thereon. Alternatively, the base station may be fully in charge of managing final data transmission and inform the UE whether the UE needs to provide CSI feedback for the fully overlapped NC JT or CSI feedback for the partially overlapped NC JT.

When the partially overlapped NC JT is applied, the base station may efficiently configure an MCS by informing the UE of subband (SB) CSI reporting. For example, assuming that the NC JT is performed in RBs 1, 2, and 3, if SB 1 is used by TP 1, SB 2 is used by TPs 1 and 2, and SB 3 is used by TP 2 for data transmission, the base station may configure the MCS using CSI in SB 2. In the case of SBs 1 and 3, since the base station needs to receive a CQI when a single TP transmits data, the base station may configure three CSI report settings. For report setting 1, the UE may calculate the CSI by performing channel measurement using the CSI-RS of TP 1. For report setting 2, the UE may calculate the CSI for the NC JT by performing the channel measurement using the CSI-RS of TP 1 and the CSI-RS of TP 2. For report setting 3, the UE may calculate the CSI by performing the channel measurement using the CSI-RS of TP 2.

When configuring MCSs for SBs 1 and 2, the base station may configure one MCS using a CQI based on report setting 1 and a CQI based on report setting 2 (for example, by averaging the CQIs). When configuring MCSs for SBs 2 and 3, the base station may configure one MCS using the CQI based on report setting 2 and a CQI based on report setting 3 (for example, by averaging the CQIs). Since SBs 1 and 2 have the same number of layers and SBs 2 and 3 have the same number of layers, RI inheritance relationship may be established such that the same RI is configured between report settings 1 and 2. Similarly, the RI inheritance relationship may be established such that the same RI is configured between report settings 2 and 3.

Figure 9:
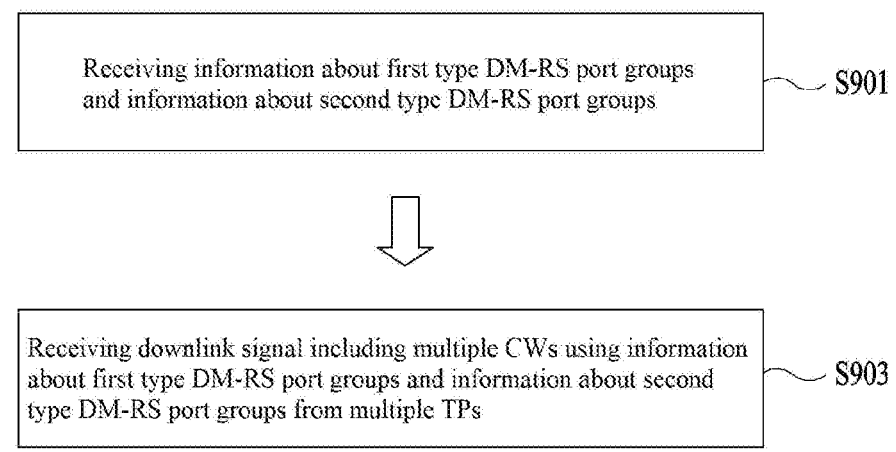
FIG. 9 is a flowchart illustrating an example of receiving a DL signal according to an embodiment of the present disclosure.

FIG. 9 is a flowchart illustrating an example of receiving a DL signal according to an embodiment of the present disclosure.

Referring to FIG. 9, a UE may receive information on two or more first type DM-RS port groups and information on two or more second type DM-RS port groups from a network in step 901. In particular, the two or more first type DM-RS port groups may correspond to different TPs, and the two or more second type DM-RS port groups may correspond to different CW.

In step 903, the UE may receive DL signals, each of which includes two or more CWs, from two or more TPs constituting the network based on the information on the two or more first type DM-RS port groups and the information on the two or more second type DM-RS port groups. The UE may receive the DL signals on the assumption that antenna ports in each of the two or more first type DM-RS port groups are QCL with the same CSI-RS.

Additionally, although not shown in the drawing, the UE may receive two or more CSI-RSs and report to the network rank information for each of the two or more CSI-RSs. The information on the two or more first type DM-RS port groups and the information on the two or more second type DM-RS port groups may be determined by the network based on the rank information.

Figure 10:
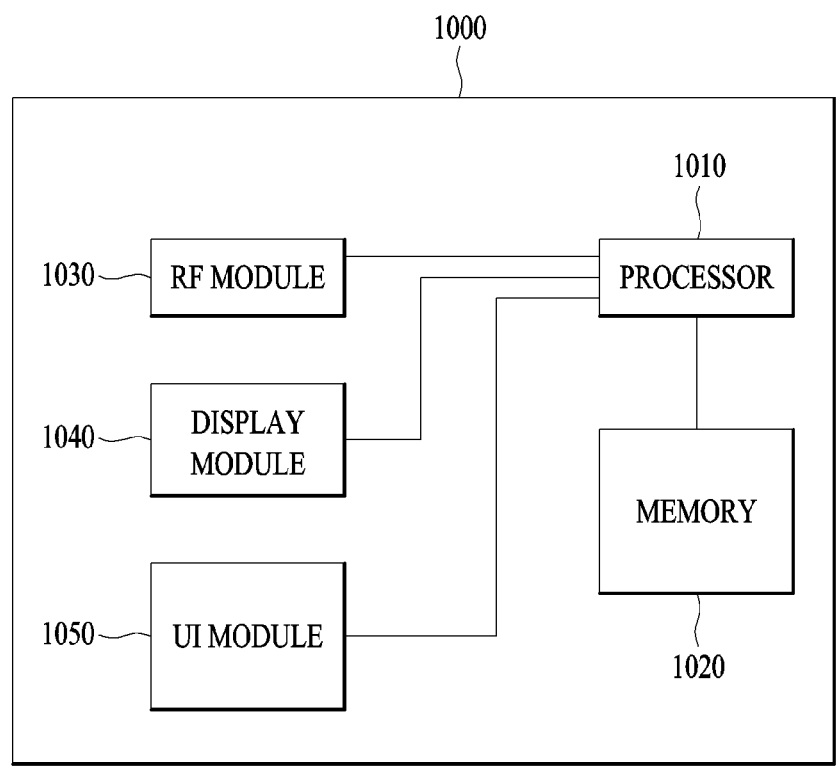
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, a Radio Frequency (RF) module 1030, a display module 1040 and a user interface module 1050.

The communication apparatus 1000 is shown for convenience of description and some modules thereof may be omitted. In addition, the communication apparatus 1000 may further include necessary modules. In addition, some modules of the communication apparatus 1000 may be subdivided. The processor 1010 is configured to perform an operation of the embodiment of the present invention described with respect to the drawings. For a detailed description of the operation of the processor 1010, reference may be made to the description associated with FIGS. 1 to 9.

The memory 1020 is connected to the processor 1010 so as to store an operating system, an application, program code, data and the like. The RF module 1030 is connected to the processor 1010 so as to perform a function for converting a baseband signal into a radio signal or converting a radio signal into a baseband signal. The RF module 1030 performs analog conversion, amplification, filtering and frequency up-conversion or inverse processes thereof. The display module 1040 is connected to the processor 1010 so as to display a variety of information. As the display module 1040, although not limited thereto, a well-known device such as a Liquid Crystal Display (LCD), a Light Emitting Diode (LED), or an Organic Light Emitting Diode (OLED) may be used. The user interface module 1050 is connected to the processor 1010 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

The above-mentioned embodiments of the present invention are disclosed on the basis of a data communication relationship between a base station and a user equipment. Specific operations to be conducted by the base station in the present invention may also be conducted by an upper node of the base station as necessary. In other words, it will be obvious to those skilled in the art that various operations for enabling the base station to communicate with the user equipment in a network composed of several network nodes including the base station will be conducted by the base station or other network nodes than the base station. The term "Base Station" may be replaced with the terms fixed station, Node-B, eNode-B (eNB), or access point as necessary.

The embodiments of the present invention may be implemented by a variety of means, for example, hardware, firmware, software, or a combination thereof. In the case of implementing the present invention by hardware, the present invention may be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention may be implemented in the form of a variety of formats, for example, modules, procedures, functions, etc. The software code may be stored in a memory unit so as to be driven by a processor. The memory unit may be located inside or outside of the processor, so that it may communicate with the aforementioned processor via a variety of well-known parts.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

The invention claimed is:

1. A method of receiving a downlink signal by a user equipment (UE) in a wireless communication system, the method comprising:
    receiving three or more channel status information-reference signals (CSI-RSs) from a network;
    reporting rank information for each of the three or more CSI-RSs to the network;
    receiving, from the network, control information about three or more first type demodulation-reference signal (DM-RS) port groups and information about two second type DM-RS port groups, wherein the three or more first type DM-RS port groups and the two second type DM-RS port groups are determined based on the rank information; and
    receiving the downlink signal from three or more network transmission points based on the control information,
    wherein the downlink signal includes two codewords,
    wherein the three or more first type DM-RS port groups correspond to the three or more transmission points,
    wherein the two second type DM-RS port groups correspond to the two codewords,
    wherein one of the two codewords is received from two transmission points among the three or more transmission points, and
    wherein the control information includes information related to a mapping relationship between a second type DM-RS port group corresponding to the one codeword and two first type DM-RS port groups corresponding to the two transmission points.

2. The method of claim 1, wherein receiving the downlink signal comprises receiving the downlink signal on an assumption that antenna ports in each of the three or more first type DM-RS port groups are quasi co-located (QCL) with the same CSI-RS.

3. A user equipment (UE) in a wireless communication system, the UE comprising:
a receiver; and
a processor operatively connected to the receiver,
wherein the processor is configured to:
receive three or more channel status information-reference signals (CSI-RSs) from a network;
report rank information for each of the three or more CSI-RSs to the network;
receive, from the network, control information about three or more first type demodulation-reference signal (DM-RS) port groups and information about two second type DM-RS port groups, wherein the three or more first type DM-RS port groups and the two second type DM-RS port groups are determined based on the rank information; and
receive a downlink signal from three or more network transmission points based on the control information,
wherein the downlink signal includes two codewords,
wherein the three or more first type DM-RS port groups correspond to the three or more transmission points, and
wherein the two second type DM-RS port groups correspond to the two codewords,
wherein one of the two codewords is received from two transmission points among the three or more transmission points, and
wherein the control information includes information related to a mapping relationship between a second type DM-RS port group corresponding to the one codeword and two first type DM-RS port groups corresponding to the two transmission points.

4. The UE of claim 3, wherein the processor is further configured to receive the downlink signal on an assumption that antenna ports in each of the two first type DM-RS port groups are quasi co-located (QCL) with the same CSI-RS.

* * * * *